United States Patent [19]

Schulz

[11] Patent Number: 4,865,734
[45] Date of Patent: Sep. 12, 1989

[54] BUOYANT COARSE MEDIA FLOCCULATOR

[76] Inventor: Christopher R. Schulz, 46 Ancell St., Alexandria, Va. 22305

[21] Appl. No.: 173,611

[22] Filed: Mar. 25, 1988

[51] Int. Cl.[4] ............................................. C02F 1/52
[52] U.S. Cl. ................................... 210/279; 210/205; 210/291; 210/715
[58] Field of Search ............... 210/661, 714, 715, 786, 210/792–796, 190, 205, 207, 208, 220, 263, 275, 279, 289, 291, 521, 535

[56] References Cited

U.S. PATENT DOCUMENTS

| 468,984 | 2/1892 | Boeing | 210/283 |
|---|---|---|---|
| 3,419,491 | 12/1968 | Messa | 210/715 |
| 3,923,649 | 12/1975 | Sparham et al. | 210/715 |
| 4,115,266 | 9/1978 | Ohshima | 210/786 |
| 4,448,689 | 5/1984 | von Nordenskjold | 210/521 |
| 4,608,181 | 8/1986 | Hsiung et al. | 210/786 |
| 4,743,382 | 5/1988 | Williamson et al. | 210/792 |

FOREIGN PATENT DOCUMENTS 1147054  4/1969  United Kingdom ................. 210/661

*Primary Examiner*—Peter Hruskoci
*Attorney, Agent, or Firm*—Richard C. Litman

[57] ABSTRACT

A coarse media flocculator utilizes buoyant media restrained against upward movement in a vertical chamber whose cross-sectional area increases uniformly in the direction of flow, thereby providing a uniformly tapering velocity gradient. The height of the media restrainer within the chamber can be adjusted, thereby changing the depth and cross-sectional characteristics of the media bed within the tapered chamber. The velocity gradients of the flocculator can thus be changed independent of flow. A washwater piping grid with downwardly pointed jet spray nozzles is positioned within the media bed for cleaning. The height of the media bed can be adjusted by changing the position of the media restrainer or by changing the liquid level within the chamber, thus changing that part of the media bed where the jet spray is concentrated. In one embodiment, the restrainer is disposed within an area of the chamber above the tapered portion having a uniform cross-section. This arrangement facilitates adjustment of the position of the restrainer and also facilitates cleaning by allowing the restrainer to be repeatedly pushed downwardly, thereby pulsating the media bed. In a second embodiment, a two-piece restrainer is disposed within the tapered portion of the chamber and is sectional and consequent flocculation parameters to be adjusted in both upper and lower portions of the media bed.

15 Claims, 4 Drawing Sheets

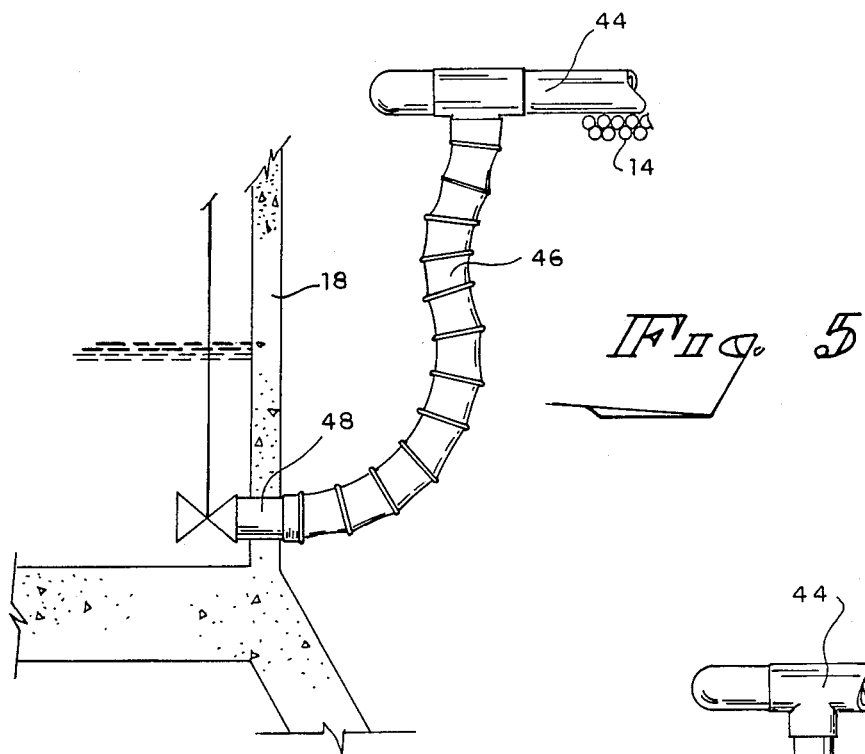
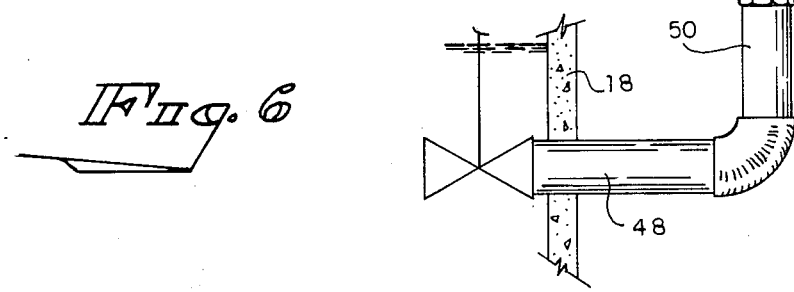
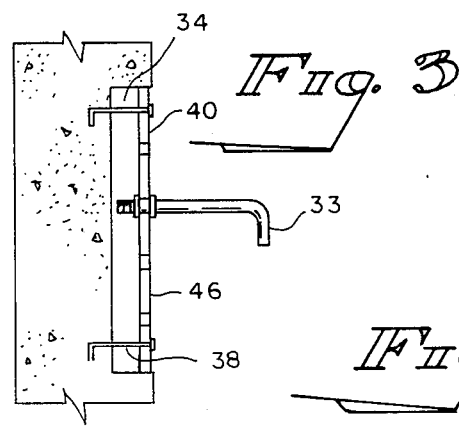
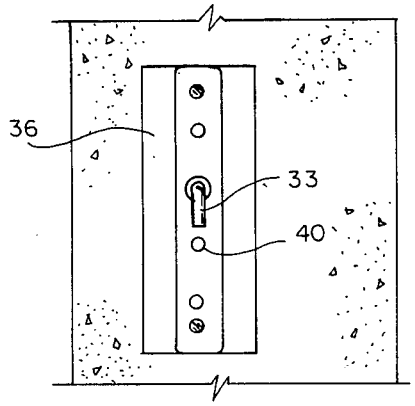

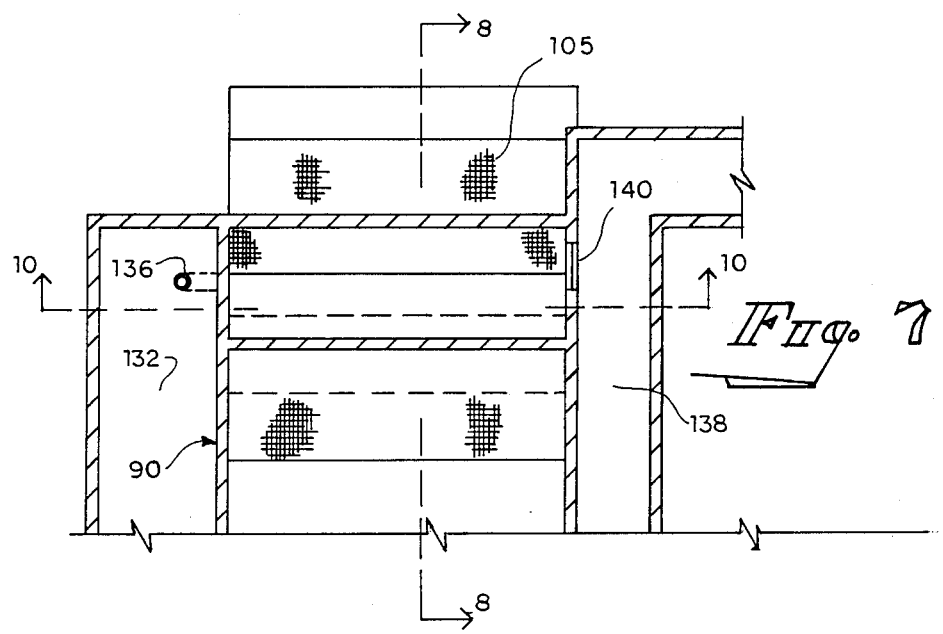
*Fig. 7*
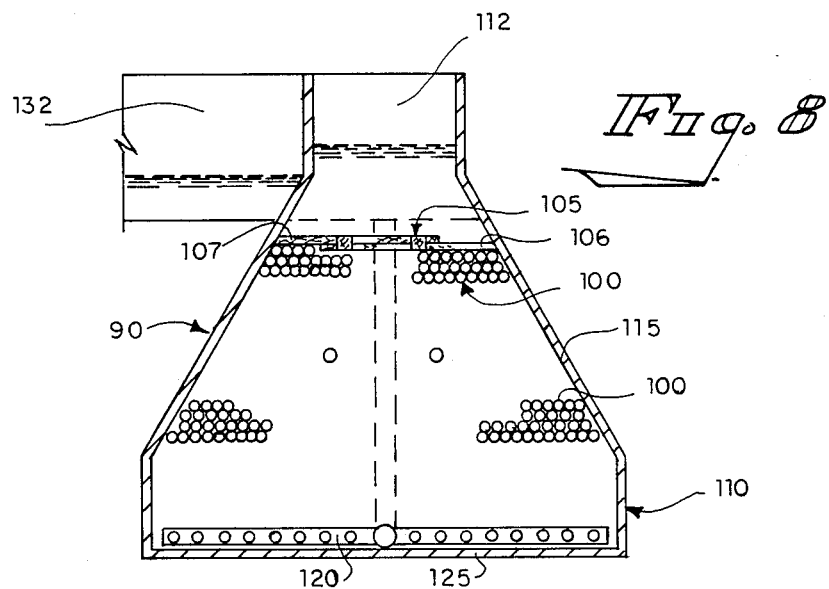
*Fig. 8*
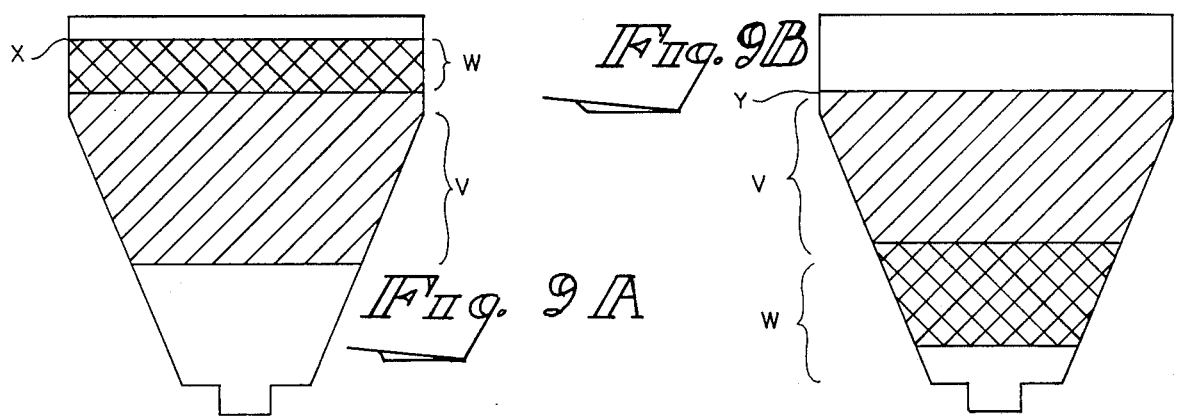
*Fig. 9A*
*Fig. 9B*

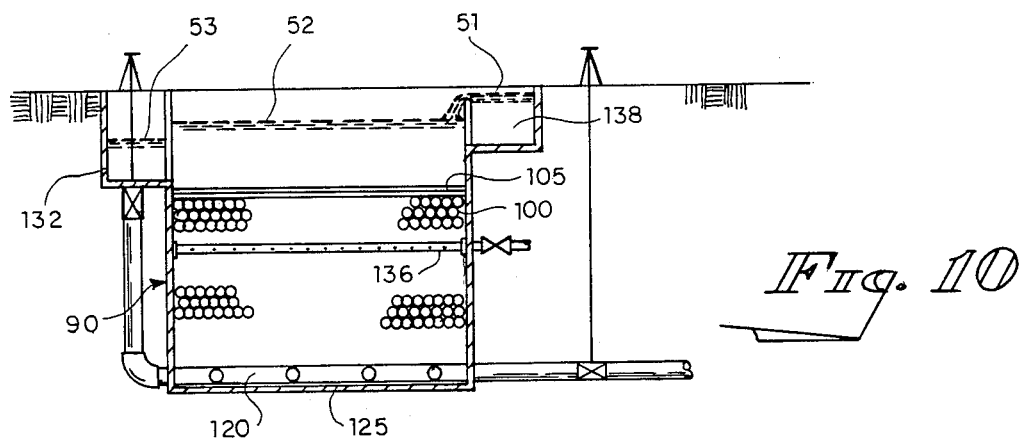

BUOYANT COARSE MEDIA FLOCCULATOR

BACKGROUND OF THE INVENTION

1. Field of the Invention

This invention relates to flocculators and particularly to those used in the treatment of water and wastewater.

More specifically, this invention relates to hydraulic flocculators wherein flocs are formed by the passage of water through a bed of buoyant coarse media and which include means whereby the mixing intensity for flocculation, can be varied independent of the flowrate through the flocculator.

2. DESCRIPTION OF THE PRIOR ART

Flocculation is the process of gentle and prolonged agitation during which coagulated particles suspended in a liquid, such as water or wastewater, coalesce into larger masses which are removed by subsequent treatment processes, particularly sedimentation.

There are two classes of flocculators: mechanical flocculators and hydraulic flocculators. In mechanical flocculators, mechanical means are used to agitate the liquid. The speed of the mechanically operated paddles or turbines used in mechanical flocculators can be adjusted to suit variations in flow, temperature, or quality of the untreated liquid independent of the rate of flow through the flocculator. Mechanical flocculators, however, are often subject to flow short-circuiting, i.e., a portion of the incoming liquid passes through the flocculation chamber in less than the nominal detention period. Consequently, this portion of the liquid is not fully exposed to the agitation imparted by the flocculator paddles or turbines.

In hydraulic flocculators, agitation is induced by the flow of liquid through the flocculator. Hydraulic flocculators are generally simpler and less expensive than mechanical flocculators because they do not require complicated mechanical equipment. In places where it is feasible to use gravity to bring the untreated liquid to the flocculator for treatment, hydraulic flocculators do not need an outside source of power such as raw water pumping to provide the energy input necessary for flocculation. In the past, however, hydraulic flocculators have exhibited several disadvantages which have limited their use in water and wastewater treatment plants. These include: (1) very limited flexibility to respond to changes in the quality of the raw water or wastewater; (2) their hydraulic and consequent flocculation parameters are a function of flow and cannot be adjusted independently; (3) energy (or head) losses across the flocculator are appreciable and often dictates that additional pumping capacity be installed upstream from the flocculator unit; and (4) cleaning can be difficult.

Hydraulic flocculators, make use of baffled channels, hydrualic jet-action, or a bed of coarse media to induce mixing for flocculation. In coarse media flocculators, agitation of the liquid is created by the passage thereof through a bed of coarse media, such as gravel.

Coarse media flocculators offer several unique advantages over mechanical and other types of hydraulic flocculators:

The coarse media provide ideal conditions for floc formation because of the continuous and uniform particle recontacts provided by the sinuous flow of liquid through the interstices (i.e., void spaces) formed by the media.

Agglomerated flocs are stored within the coarse media bed, reducing sludge-storage requirements in subsequent treatment units.

Flocculation time can also be reduced considerably in coarse media flocculators, to as little as one-sixth of the time required by mechanical flocculators, because the entire bed is effective in the formation of sizable flocs—there is very little short-circuiting of flow through the chamber, and very few dead spaces which do not receive adequate mixing.

It is known in the prior art that tapered velocity gradients in a coarse media flocculator can be achieved by two methods, which may be used alone or in combination. In the first method, a graduated flocculation chamber is used, i.e., one in which the cross-sectional area of the chamber increases in increments. In the second method, several layers of coarse media are used, each comprising media of a different size range and graded from small to large in the direction of flow.

However, in the course of using either of the above methods, the velocity gradients increase in increments, rather than continuously. In addition, the velocity gradients are still a function of flow and cannot be readily adjusted independent of the rate of flow. Furthermore, a gravel-bed flocculators are susceptible to fouling, either by intercepted flocs or by biological growth in the gravel. Cleaning of the media bed can be difficult due to its densely-packed nature; expansion of the media bed by backwashing is not feasible due to the weight and large size of the media. Therefore, gravel-bed flocculators must be cleaned manually or by means of complex and expensive backwashing and/or air scouring equipment.

No prior patents are known of flocculators making use of buoyant coarse media. There are, however, patents covering filters utilizing buoyant media. Representative of these is U.S. Pat. No. 468,984 to Boeing, which discloses an upflow filter having a bed of buoyant media comprising wood blocks restrained by a horizontal partition. These patents in no way, however, eviscerate the patentability of the present invention.

SUMMARY OF INVENTION

It is a general object of the present invention to provide an improved coarse media flocculator wherein the velocity gradients can be varied independent of the rate of discharge.

It is a further object of the present invention to provide a buoyant coarse media flocculator having means to facilitate cleaning of the media bed while the flocculator is in service or while it is removed from service to allow for more extensive cleaning.

It is a more particular object of the present invention to provide a coarse media flocculator utilizing buoyant media and having a tapered portion with means for adjusting the vertical position of the media bed within that chamber, whereby the depth and cross-sectional characteristics of the media bed can be changed.

It is a further object of the present invention to provide a media bed disposed within a chamber whose cross-section increases uniformly in the direction of flow through the chamber, whereby the velocity gradient decreases uniformly as liquid flows through the media bed, thereby enhancing floc formation and discouraging shearing of flocs.

It is still another object of the present invention to provide a buoyant coarse media flocculator having a media restrainer disposed within a portion of a flocculation chamber having a constant cross-section, whereby the vertical position of the cross-sectional and consequent flocculation parameters in the lower portion of the media bed may be varied.

It is a related object of the present invention to provide a buoyant course media flocculator having a media restrainer which is adjustable in one direction disposed within a portion of a flocculation chamber having a varying cross-section, whereby the vertical position of the restrainer may be adjusted, and whereby the cross-sectional and consequent flocculation parameters in both the upper and lower portions of the media bed may be varied.

It is an additional object of the present invention to provide an effluent piping grid and outlet structure within a flocculation chamber designed to collect flocculated water uniformly, without shearing flocs or allowing them to settle out within the piping grid and without letting media escape from the flocculation chamber.

It is an additional object of the present invention to provide a simple flow-through flocculation system in which the need for drive motors, agitator impellers, speed controllers and reducers or other complex mechanical components is eliminated between the inlet and outlet ports of the flocculator.

It is another object of the present invention to provide a more efficient flocculator which can develop settleable or filterable flocs in less time and using less coagulating chemicals than required by mechanical flocculators.

Finally, it is another object of the present invention to provide a plurality of flocculators which can operate in parallel, whereby virtually any flow requirement can be satisfied, and whereby flocculation processes can proceed uninterrupted while one flocculator is removed from service for cleaning.

The present invention utilizes a bed of buoyant coarse media restrained against upward movement in a flocculation chamber by a permeable horizontal partition. The chamber is tapered so that the area of the cross section increases uniformly in the direction of flow. Means are provided whereby the vertical position of the partition can be changed, thus changing the depth and cross-sectional characteristics of the media bed. In one embodiment, liquid flows upwardly through the chamber and the partition is disposed within an untapered portion immediately above the tapered portion of the chamber. In a second embodiment, liquid flows downwardly through the chamber and the two-piece partition that is adjustable in one direction is disposed within the tapered portion of the flocculator chamber and can be positioned at various depths, thereby altering the cross-sectional and consequent flocculation parameters in both the upper and lower portions of the media bed.

BRIEF DESCRIPTION OF THE DRAWINGS

FIG. 3 is a vertical sectional view of a preferred embodiment of a hold-down clamp for the media restrainer.

FIG. 4 is an elevational view of the device of FIG. 3.

FIG. 5 is an enlarged view of a flexible conduit connecting the effluent piping grid and the outlet port.

FIG. 6 is an enlarged view of a telescoping pipe structure connecting the effluent piping grid and the outlet port.

FIG. 7 is a horizontal sectional view of a downflow flocculator embodying the present invention.

FIG. 8 is a vertical sectional view of the apparatus of FIG. 7 taken along line 8—8.

FIGS. 9A and 9B are diagrammatic views showing how the configuration of the media bed changes when the position of the media restrainer is altered.

FIG. 10 is a vertical sectional view, taken along the line 10—10 of FIG. 7.

DETAILED DESCRIPTION OF THE INVENTION

Figure 1:
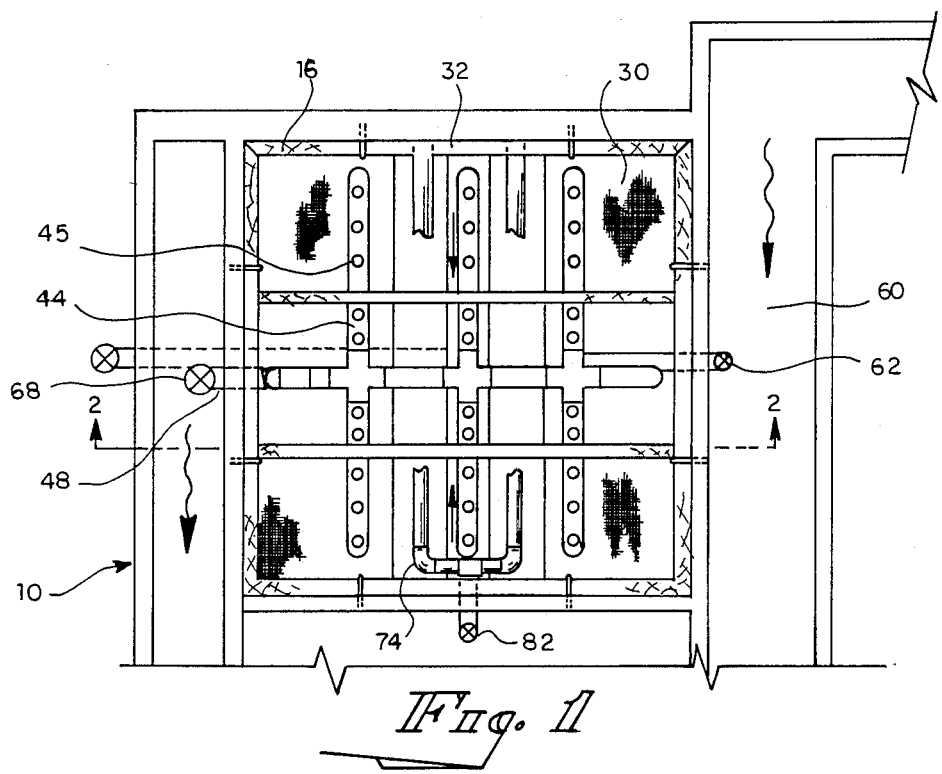
FIG. 1 is a top plan view of an upflow flocculator embodying the present invention.
Figure 2:
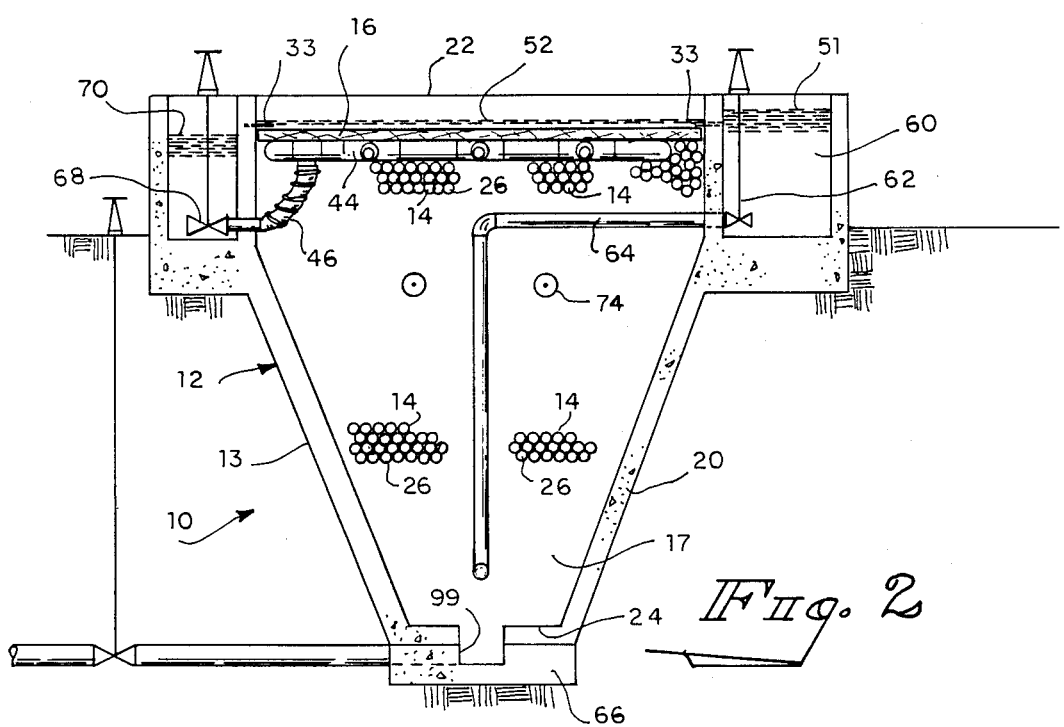
FIG. 2 is a vertical sectional view, taken along the line 2—2 of FIG. 1.

Turning now to the drawings, FIGS. 1 and 2 show an upflow flocculator 10 embodying the present invention. Upflow flocculator 10 comprises flocculation chamber 12, which includes tapered portion 13, influent zone 17 and effluent zone 18. Buoyant coarse media bed 14 is restrained within chamber 12 by media restrainer 16. Media restrainer 16 is disposed within effluent zone 18, which, unlike flocculation chamber 12, has a constant cross-section. As will hereinafter be more completely described, means are provided whereby the position of media restrainer 16 within effluent zone 18 can be adjusted, thereby changing the depth and cross-section of media bed 14.

Flocculation chamber 12 is preferably constructed of concrete, steel or fiberglass and is prferably rectangular in cross-section. Tapered portion 13 preferably comprises two tapered walls 20 and two vertical walls. The cross-section of tapered portion 13 is thus square at the top 22 and rectangular at the bottom 24. Although all four walls of tapered portion 13 could be tapered, tapering only two of the walls is less expensive and provides adequate tapering.

Buoyant coarse media bed 14 comprises preferably spherical elements 26. Elements 26 can be formed of any suitable buoyant material, but are preferably formed of solid or hollow plastic material having a specific gravity less than that of water, such as polyethylene or polypropylene. Preferably, the outer surfaces of spherical elements 26 will be smooth, thereby allowing flocs and biological growths to rapidly slough off the media during cleaning. The diameters of spherical elements 26 influence the magnitude of velocity gradients present within media bed 14. Using recognized predictive equations for flow through porous media, it is anticipated that the diameter of elements 26 will range from 10 mm to 50 mm, depending on the magnitude and range of velocity gradients desired, and are uniform throughout the media bed.

Media restrainer 16 may comprise stainless steel wire screening 30 which is stretched across a wooden supporting frame or structure 32 and secured thereto by suitable means. Media restrainer 16 has a cross-sectional area slightly less than that of effluent zone 18 so that it prevents the media from escaping but is readily movable within effluent zone 18.

Means are provided whereby media restrainer 16 can be secured at different vertical levels within effluent zone 18. In the first embodiment, as seen in FIGS. 3 and 4, the walls of effluent zone 18 are provided with recessed areas 34 in which stainless steel bearing plates 36 are secured by means of anchor bolts 38. The bearing plates 36 are provided with a plurality of vertically spaced apertures 40 in which hold-down bars 33 are selectively threaded. Media restrainer 16 is thus held in place as it bears against hold-down bars 33 from below. The ends of hold-down bars 33 are turned down at right angles so that hold -down bars 33 can be be tightened and loosened manually.

A vertically displaceable effluent piping grid 44 is disposed immediately beneath media restrainer 16 and restrained against upward movement thereby. At this location, flocculated liquid can be collected by effluent piping grid 44 within the top portion of media bed 14, thereby preventing the build-up of flocs on top of the media due to the sudden drop in velocity as the flow of liquid emerges from media bed 14. Effluent piping grid 44 moves vertically along with media restrainer 16, and includes a main and lateral arrangement of perforated plastic pipes which allows for even drainage across the flocculation chamber, thereby avoiding excessive velocity gradients which can shear flocs. Pipe diameters and perforations must be carefully selected to avoid the formation of excessive velocity gradients inside piping grid 44 and to prevent flocs from settling out therein. Piping grid 44 may be fastened directly to media restrainer 16 by means of stainless steel wires or straps to ensure that its correct position is maintained.

To accommodate the vertical movement of effluent piping grid 44, a flexible pipe outlet 46, shown most clearly in FIG. 5, is provided for connecting piping grid 44 to outlet port 48. Alternatively, as shown in FIG. 6, a telescoping pipe structure 50 may be used to connect piping grid 44 to outlet port 48. These outlet structures are carefully sized to prevent the formation of excessive velocity gradients.

In operation, as is best shown in FIGS. 1 and 2, liquid flows along inlet header channel 60, through inlet valve 62, then through inlet pipe 64 to the bottom 66 of flocculation chamber 12. The liquid then flows upwardly through media bed 14, where flocs are formed by the continuous flow of liquid through the interstices formed by the media. Flocculated liquid then flows through submerged performations 45 into effluent piping grid 44. It then flows through flexible pipe outlet 46 or telescoping pipe structure 50, through outlet valve 68, and into flocculated liquid channel 70, which carries it downstream for further treatment, such as sedimentation.

It is anticipated that, following an initial start-up period, during which media bed 14 will become partially clogged with entrapped flocs, a steady-state effluent floc size distribution will be reached, and the entrapment and release of floc particles within the media bed will be roughly equal. Thus upflow flocculator 10 should be considered as a flow through device, not a filtering device, with minimal retention of flocs in the media bed. Accordingly, cleaning of media bed 14 will be required relatively infrequently unless the particulate loading is unusually high or fluctuates widely.

It is further anticipated that the presence of previously deposited flocs in media bed 14 will improve the operation of the device significantly by increasing the concentration and collision frequency of flocs flowing through the bed. Hence, dosages of coagulant chemicals will tend to be lower than would be required to operate other types of flocculators.

Nevertheless, the proposed system will require cleaning from time to time. For this purpose a washwater piping grid 74 with jet spray nozzles spaced uniformly across the grid and pointed downward is installed near the top face of the buoyant media bed and is supported by the walls of the flocculation chamber. The layout of piping grid 74 provides effective coverage of the entire media bed 14. The system is designed to be connected to pressurized water lines serving the treatment plant, using a pressure reducing valve as required. If pressurized water is not available, the system can be pressurized with water from an adjacent flocculation chamber or sedimentation basin. This would be achieved by partially draining the tank to be cleaned in order to establish a differential pressure head between the two units. Washwater piping grid 74 may be used for partial cleaning of media bed 14 with minimal disruption of the flocculation process, or for more thorough cleaning which requires that the flocculator be removed from service. For partial cleaning, the rate of washwater is controlled by a throttling valve 82 in the washwater line which should be adjusted to provide sufficient water pressure for expanding media bed 14 slightly so that entrapped flocs can be dislodged without shearing them. If necessary, media restrainer 16 may be pushed downwardly to assist in the cleaning process. Full cleaning of media bed 14 is accomplished by draining the flocculator unit completely and rapidly so that flocs retained in the bed are sloughed off the media and carried away with the wastewater. Drain opening 99 is screened to prevent loss of media 14 when the flocculation chamber 12 is drained. If necessary, the plastic media can be further cleaned by using fixed washwater grid 74 with fully pressurized water.

Since the height of media bed 14 can be adjusted by changing the position of media restrainer 16 of the liquid level within flocculation chamber 12, the jet spray from washwater piping grid 74 can be concentrated at different levels within media bed 14.

For small treatment plants, additional reserve flocculator units may be required to provide continuous flocculation when one or more primary units are removed from service for cleaning. For larger plants, reserve units may not be necessary since cleaning cycles for individual flocculator units can be staggered. The flocculator should be cleaned after a predetermined head loss across the media bed is exceeded.

FIGS. 7, 8 and 10 show an alternative embodiment for the flocculator, in which water flows downwardly through flocculation chamber 90. As can be seen, the geometrical configuration of the chamber is reversed from that of the upflow flocculator, with a smaller rectangular cross-section at the top and a larger square cross-section at the bottom. Buoyant media bed 100 comprises the same material as in the upflow version.

If media restrainer 105 is to be confined to influent zone 112 having a uniform cross-section, it can be of the same design as is used in the upflow version of the device, and can be held in place by the same means. It will be course be rectangular in shape, to conform to the shape of influent zone 112. If, on the other hand, media restrainer 105 is to be disposed within tapered portion 115 of flocculation chamber 90, it is not necessary to provide means to secure it in place, as it will be held in place as it bears against tapered portion 115 of flocculation chamber 90 from underneath. However, since the cross-sectional area of tapered portion 115 varies, media restrainer 105 must be adjustable in one dimension. This can be accomplished by using two overlapping screened partitions 106 and 107 held in position by stainless steel guide rails 113 so that they are free to slide back and forth horizontally. Spring-loaded telescoping piping or adjustable bracket arms can be mounted on the partition assembly and used to position the assembly at the desired level within tapered portion 115 of flocculation chamber 90. Alternatively, several media restrainers may be provided, each designed to fit within tapered portion 115 at a different level. In the downflow version of the flocculator, it is preferable to install media restrainer 105 within tapered portion 115 of flocculation chamber 12 so that it is possible to adjust the larger velocity gradients which occur in the upper portion of the media bed.

In the downflow version, coagulated liquid from an inlet header channel 138 discharges freely over an adjustable rectangular weir 140 into flocculation chamber 90. A minimum liquid depth is maintained between weir 140 and media restrainer 105 to dissipate the turbulence created by liquid flowing over weir 140 and to thereby avoid disruption of buoyant media bed 100. Alternatively, a vertical pipe with an adjustable circular weir at the higher end and having its lower end aligned to discharge under submerged conditions into influent zone 112 can be installed within inlet header channel 138 as a means to avoid disruption of the media bed 100.

Flocs formed within media bed 100 move downwards through effluent zone 110 by the force of gravity and are removed by effluent piping grid 120. Piping grid 120 is fixed to the bottom 125 of flocculation chamber 90. A first outlet of piping grid 120 discharges into flocculated water channel 132 and a second outlet to drainage. Valves with extended operators are provided at both outlets to control the direction of flow.

As is the case with the upflow version 10 of the present invention, the downflow flocculator will periodically require cleaning to remove accumulated flocs. Therefore, the downflow flocculator also includes a washwater piping grid 74 for facilitating rinsing of media bed 100. The flow through the piping grid 74 is controlled by throttling valve 82.

FIGS. 9A and 9B illustrate how changing the position of the media restrainer changes the depth and cross-sectional area of the flocculation zone, i.e., the fixed volume occupied by the buoyant media. As is shown in FIG. 9A, which employs upflow flocculator 10 for demonstrative purpose, X represents the position of the media restrainer. In FIG. 9b, the media restrainer has been lowered to the position represented by Y. In both figures, volume V is occupied by the media bed. However, in FIG. 9b, the cross-hatched volume W has been transferred from the top of the flocculation chamber to the bottom. As a result, in FIG. 9b, the cross-sectional area of the lower portion of the media bed has been decreased, and the depth of the media bed has been increased.

Since the rate of flow through the media bed is constant, decreasing the cross-section of the media bed increases the interstitial velocity of flow at that point. Increasing the interstitial velocity increases the velocity gradient, which is a measure of the degree of mixing in the flocculation chamber. The rate of particle collisions is proportional to the velocity gradient. The total number of particle collisions, a measure of flocculation efficiency, is proportional to the product of the velocity gradient and the nominal detention time of the liquid flowing through flocculation chamber 12.

The velocity gradient in a coarse media flocculator may also be changed by varying the flowrate across the media bed. This is accomplished by arranging plural flocculators in parallel, and by varying the number of flocculators in service. The liquid flow is divided evenly among several flocculator units by means of a common inlet header channel with adjustable weirs (such as 140, shown in FIG. 7) at each flocculator inlet. Alternatively, submerged inlet pipes with control valves to modulate the flow can be used. Increasing the number of flocculator units increases the flexibility of the system. Note, however, that varying the flow rate in a single flocculator unit will vary the liquid detention time in the unit proportionally. The capability for adjustment of both the chamber detention time and velocity gradient is helpful in optimizing the size and density of flocs produced by the device.

It will be understood that existing mechanical flocculation chambers could readily be retro-fitted to conform to the present invention by introducing sidewalls made of fiberglass, plastic or other lightweight, rigid material inside of the chambers, and attaching these walls to the sides and bottoms of the chambers at the desired angle of inclination, thereby providing a suitable enclosure for a bed of buoyant coarse media. In addition, the present design could readily be incorporated into reactor-clarifiers, which are center-feed clarifiers with flocculation zones built into the central compartment. The use of buoyant media would eliminate short-circuiting within the flocculation zone and promote better flow distribution patterns in the sedimentation zone of reactor-clarifiers.

As will be clear to those skilled in the relevant art, numerous modifications and embellishments of the present invention are possible. The above description of the present invention is intended as only illustrative of the fundamental concepts of the present invention, and hence all modifications which lie within the scope of the appended claims may be utilized.

I claim:

1. A coarse media flocculation apparatus permitting alterable flocculation characteristics comprising;

a vertically disposed flocculation chamber having an inlet port disposed below an outlet port and allowing liquid to flow vertically through said chamber, said flocculation chamber including a tapered portion intermediate said inlet port and said outlet port, an untapered portion in said fluocculation chamber immediately above said tapered portion, said tapered portion provided with a cross-sectional area increasing in the direction of flow through said flocculation chamber, a media bed within said flocculation chamber comprising buoyant coarse media to enhance floc formation in said liquid, a horizontal media restrainer disposed and secured within said flocculation chamber untapered portion and restraining said media bed against upward movement, means permitting vertical adjustment of the position of said restrainer within said flocculation chamber, a buoyant effluent piping grid disposed underneath and restrained by said media restrainer in said flocculation chamber, said piping grid including perforated piping designed to collect flocculated water uniformly, without shearing flocs or allowing them to settle out within the piping grid and without letting media escape from the flocculation chamber, adjustable conduit means communicating between said piping grid and said outlet port arranged to accommodate vertical adjustment of said piping grid with said media restrainer, wherein said media bed within said flocculation chamber is alterable to change the flocculation characteristics of said flocculation apparatus.

2. The apparatus of claim 1 wherein said tapered portion has a cross-sectional area increasing substantially uniformly in the direction of flow through said chamber.

3. The apparatus of claim 1 wherein said tapered portion comprises four walls, at least one of said walls slanting away from center in the direction of flow through said chamber.

4. The apparatus of claim 1 wherein said bed of buoyant media comprises individual elements of substantially uniform size.

5. The apparatus of claim 4 wherein the diameter of said elements is between approximately 10 mm and approximately 50 mm.

6. The apparatus of claim 1 wherein said individual elements are spherical in shape.

7. The apparatus of claim 1 wherein said flocculation chamber further includes screening means for preventing the loss of said media when said apparatus is drained.

8. The apparatus of claim 1 wherein said adjustable conduit means comprises telescoping piping means.

9. The apparatus of claim 1 wherein said adjustable conduit means comprises flexible piping means.

10. The apparatus of claim 1 including a washwater piping grid disposed within said media bed.

11. A coarse media flocculation apparatus permitting alterable flocculation characteristics comprising;
a vertically disposed flocculation chamber having vertically spaced apart fluid inlet and outlet means therein allowing liquid to flow vertically through said chamber,
said flocculation chamber including a tapered portion intermediate said inlet and outlet means,
said tapered portion provided with a cross-sectional area increasing in the direction of flow through said flocculation chamber,
a media bed within said flocculation chamber comprising buoyant coarse media substantially occupying said tapered portion and allowing the flow of liquid therethrough to enhance floc formation in said liquid,
a horizontal media restrainer disposed and secured within said flocculation chamber atop said media bed and restraining said media bed against upward movement,
said fluid inlet and outlet means located to maintain a fluid level within said flocculation chamber no lower than said restrainer,
means permitting vertical adjustment and retention of the position of said restrainer within said flocculation chamber to alter the cross-sectional configuration of said media bed within said tapered portion,
an effluent piping grid with said flocculation chamber designed to collect flocculated water uniformly, without shearing flocs or allowing them to settle out within the piping grid and without letting media escape from the flocculation chamber
said outlet means including means directing liquid from said said effluent piping grid following passage of liquid through said media bed, wherein
said media bed within said flocculation chamber is alterable to change the flocculation characteristics thereof by the vertical adjustment of said retainer to produce an alteration of said media bed due to said tapered portion of said flocculation chamber.

12. The apparatus of claim 11, wherein said inlet means is disposed above said outlet means.

13. The apparatus of claim 12 wherein said effluent piping grid further includes valves disposed at each end of said grid for controlling the direction of liquid flow within the apparatus.

14. The apparatus of claim 12 including an adjustable inlet weir over which water discharges into said flocculation chamber.

15. The apparatus of claim 11 including a washwater piping grid disposed within said media bed.

* * * * *